United States Patent [19]
Caldwell et al.

[11] Patent Number: 5,445,348
[45] Date of Patent: Aug. 29, 1995

[54] AUXILIARY CABLE ATTACHMENT

[75] Inventors: William D. Caldwell, Bessemer; Wei-Chung Lin, Birmingham, both of Ala.

[73] Assignee: Reliable Bethea Power Products, Inc., Pelham, Ala.

[21] Appl. No.: 304,401

[22] Filed: Sep. 12, 1994

[51] Int. Cl.⁶ ............................................. F16L 3/08
[52] U.S. Cl. ..................... 248/74.1; 174/45 R; 174/149 R; 248/63; 248/219.4
[58] Field of Search ............ 248/68.1, 74.1, 63, 248/65, 71, 219.4; 174/149 R, 149 B, 148, 150, 45 R

[56] References Cited

U.S. PATENT DOCUMENTS

| | | | |
|---|---|---|---|
| 2,849,777 | 9/1958 | Ridgers | 248/74.1 |
| 3,474,995 | 10/1969 | Amidon | 174/158 R X |
| 3,920,938 | 11/1975 | Netzel | 174/148 X |
| 4,127,739 | 11/1978 | Farmer | 174/45 R |
| 4,903,927 | 2/1990 | Farmer | 248/219.4 |

*Primary Examiner*—J. Franklin Foss
*Attorney, Agent, or Firm*—Veal & Marsh

[57] ABSTRACT

An auxiliary cable mounting attachment is disclosed which allows mounting a third communication cable at a position displaced from superjacent power lines and existing communication cables. The attachment clamps to an existing support bar without modification thereto and extends outwardly therefrom to support a clamp engagement for the auxiliary cable.

13 Claims, 3 Drawing Sheets

AUXILIARY CABLE ATTACHMENT

BACKGROUND OF THE INVENTION

The present invention is directed to a system for supporting an additional communication cable on a support pole such as a utility pole, which serves to support existing communications cables. In greater particularity, the present invention is directed toward a system for supporting a third cable of the same type as presently supported for use in the cable television industry without utilizing any additional poles or space on existing poles.

With the advent of cable TV systems came a multiplicity of additional cabling requirements to provide service to the customers. As is evident on many residential and commercial streets, an infrastructure of utility poles and cables already exist to supply power and telephone service. The cable TV industry has in many instances been able to utilize the existing poles to support their cables. In U.S. Pat. No. 4,570,884 it was noted that in many communities it is standard practice to require a neutral zone of 40 inches between the power cable zone and the communications cable zone. It was also noted that minimum height requirements come into effect in such areas. It is also noted that certain entities restrict the ability of the cable TV system to drill additional holes for mounting hardware to the existing pole, thereby eliminating the possibility of adding additional hardware to the pole directly. The inventors in the '884 patent solved the problem of adding a communications cable in addition to the phone lines by the development of a specialized bracket. The '884 bracket extended outwardly and downwardly from the mounting hardware for the telecommunications cables. During the ensuing decade from the introduction of the '884 bracket, the bracket has been widely used, however, the explosion in communications via cable has far outstripped the capacity of the communications cable in many areas therefore necessitating the use of an auxiliary cable. Unfortunately, there is no place to put the auxiliary cable in the existing system. All of the problems facing the '884 inventors have been intensified, yet the cable must go up.

SUMMARY OF THE INVENTION

It is an object of the present invention to enable cable companies or other communications companies to mount a third communication cable to a utility pole without encroaching on the power zone while maintaining adequate separation from the adjacent existing communications cables.

Another object of the invention is to facilitate the addition of a third communications cable in areas where there is a restriction against mounting additional support hardware directly to the utility pole.

These and other objects and advantages of the present invention are accomplished in a mounting system that uses the existing support of the '884 device, reinforces the same to support the weight of an additional cable, and adds a support member that positions the additional cable in an acceptable manner. More specifically, the '884 device utilized a strap affixed to an arm at one end and to the pole by a drive screw. Our invention retains the strap and uses the aperture provided for the drive screw as the template on the pole through which a bore for a secondary bolt is provided. The secondary bolt ensures that the strap does not come loose from the pole under the added weight of an additional cable. The additional cable is supported on an auxiliary bracket which is attachable to the existing support arm without any modification thereof and without any dislocation of the existing cables thereby allowing speedy and efficient placement of the auxiliary cable.

The auxiliary bracket utilizes a open sided clamp with a single clamping bolt to secure the bracket to the support arm between the pole and the outer end of the strap. The bracket also includes an elongated shank portion extending from the clamp in offset relation outwardly beyond the strap to a point such that a cable supported by the bracket is at the same distance from the power zone as the original cable mounted to the pole. The cable is supported at the outer end of the shank by the same type strap support as are used for the secondary cable.

As will be seen, the present invention permits the third communications cable to be placed on the same pole without any greater intrusion into the neutral zone and without interference with any existing power or communications cables. Further, the mounting of third cables with this device will greatly facilitate the expansion of service by allowing greater utilization of the existing infrastructure.

BRIEF DESCRIPTION OF THE DRAWINGS

Apparatus embodying features of our invention are depicted in the accompanying drawings which form a portion of this disclosure and wherein.

DESCRIPTION OF THE PREFERRED EMBODIMENT

Figure 1:
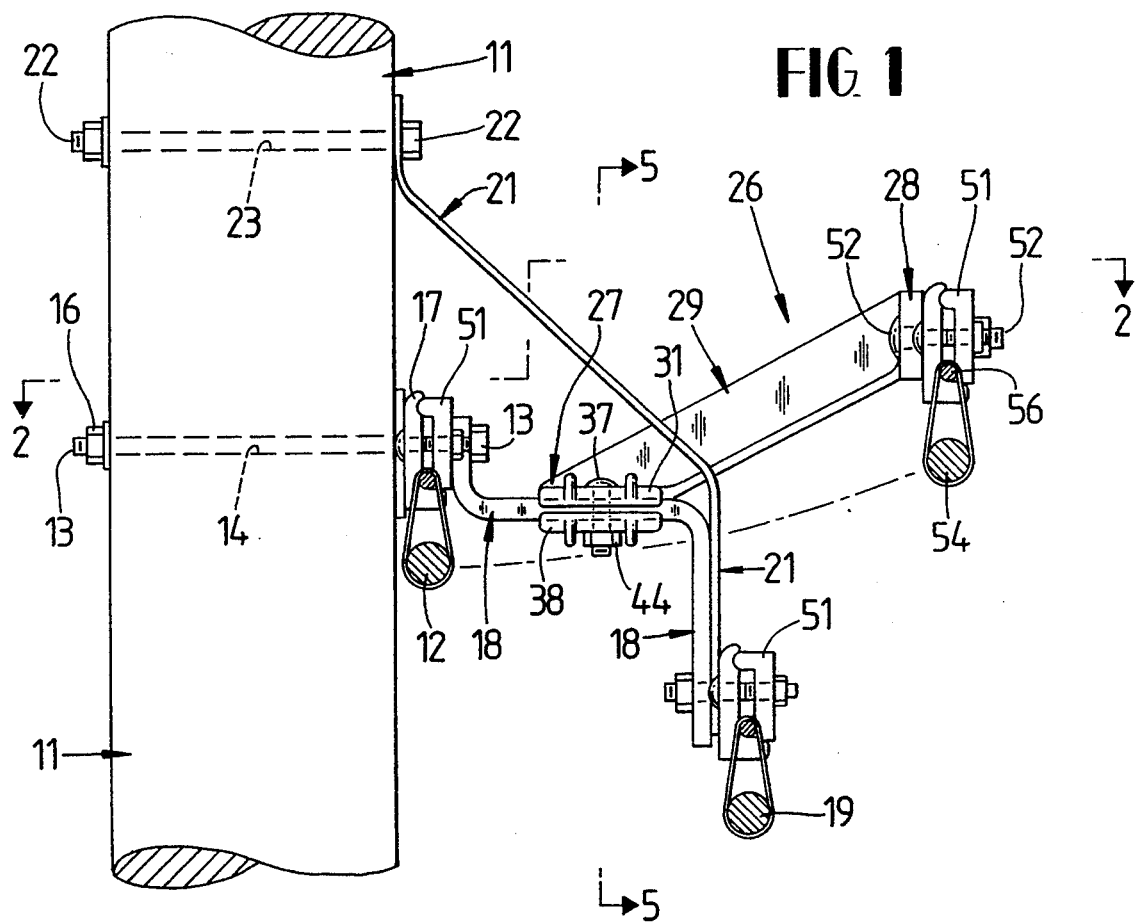
FIG. 1 is a side elevational view of our auxiliary cable attachment supporting a third communications cable on a preexisting pole.

Referring to the drawings for a clearer understanding of the invention, it will be seen in FIG. 1 that a standard wooden utility pole 11 supports a plurality of cables thereon through the use of a combination of existing hardware and the present invention. As noted in U.S. Pat. No. 4,570,884, a conventional support for a telecommunications cable 12 has been provided proximal the pole 11, utilizing a through bolt 13 which extends through a transverse bore 14 in pole 11. Standard washers surround the bolt 13 on either side of the pole 11 and the bolt 13 is secured by a threaded nut 16. A cable supporting clamp 17 is provided with an aperture through which the bolt 13 extends and is adjacent the prior art support arm 18 which is also supported on the bolt 13. A communications cable 19 is supported on the support arm 18 in the manner described in U.S. Pat. No. 4,570,884.

A strap 21 is connected to the support arm 18 as in the prior art, however, the upper end of the strap 21 is secured to the pole 11 by a through bolt 22. It is to be understood that each of the elements thus described with the exception of bolt 22 are expected to be in situ functioning as described in the '884 patent. Thus, the first departure from the prior art in the utilization of our invention is to use the aperture in the upper end of the strap 21 as a template or guide for drilling a second transverse bore 23 through pole 11, for the insertion of bolt 22. Bolt 22 is intended to provide greater security for the increased load to be encountered when an additional cable is supported.

The auxiliary attachment 26 includes a clamp end 27 and a free end 28 connected by an elongated shank 29. Clamp end 27 defines an open sided clamp which includes a base portion 31 integrally formed with shank 29. Base portion 31 is offset from the longitudinal axis of shank 29 and as shown more clearly in FIGS. 3-5 forms a downwardly opening channel 32 which is of sufficient width to receive a segment of support arm 18 therein. Channel 32 is formed in the lower face 33 of the base portion 31 distal the intersection of the shank 29 and clamp end 27 such that shank 29 is supported on clamp end 27 laterally of support arm 18. A rounded recess 34 is also formed in face 33 beneath shank 29 and parallel to channel 32. Intermediate recess 34 and channel 32 a square opening is formed through base portion 31 to permit insertion of a bolt 37 with a threaded end and a square intermediate portion such that the bolt 37 is received in non-rotating engagement within the opening 36. A movable keeper 38 forms the other cooperative member of clamp end 27 and includes a cooperative face 39 which has defined therein a channel 41 in opposition to channel 32 and having the same dimensions as channel 32 such that the segment of support arm 18 can be captured within the channels. The keeper 38 is approximately the same width and length of the base portion 31 and has formed on cooperative face 39 an arcuate protrusion 42 which is cooperatively aligned with the rounded recess 34. Intermediate protrusion 42 and channel 41 is an aperture 43 through which bolt 37 extends. A nut 44 is threadedly engaged on bolt 37 and the threaded end of the bolt 37 may be deformed to prevent inadvertent loss of the bolt 37 and nut 44. As seen in FIGS. 2-5 both the base portion 31 and the keeper 38 may have reinforcing ribs 46 extending therefrom on the surfaces thereof opposite the opposing channels.

Figure 2:
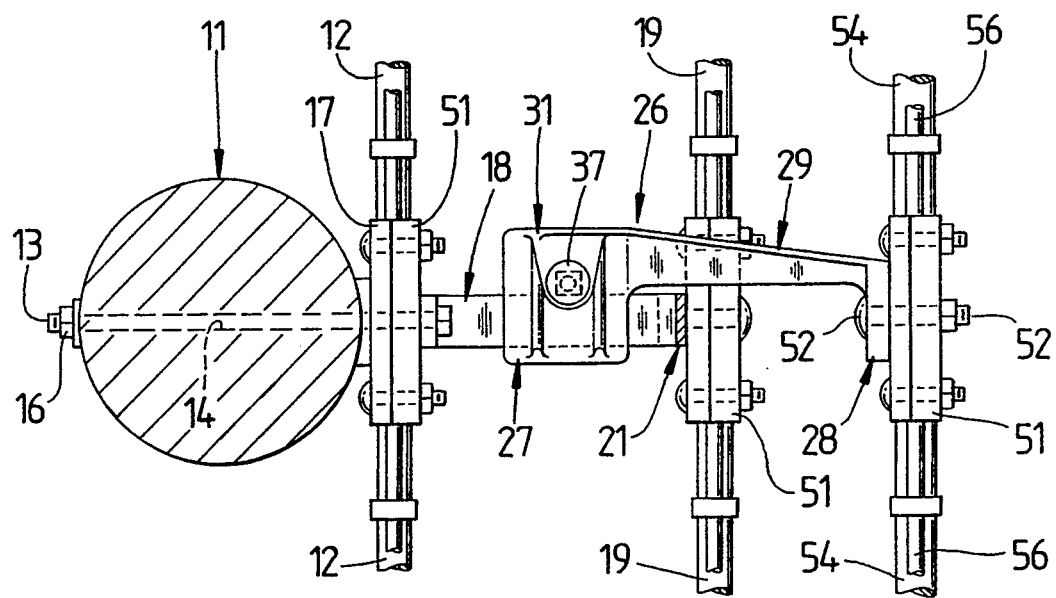
FIG. 2 is a plan view of the invention with the pole supporting the cable mounting hardware shown in section at line 2—2 of FIG. 1.
Figure 3:
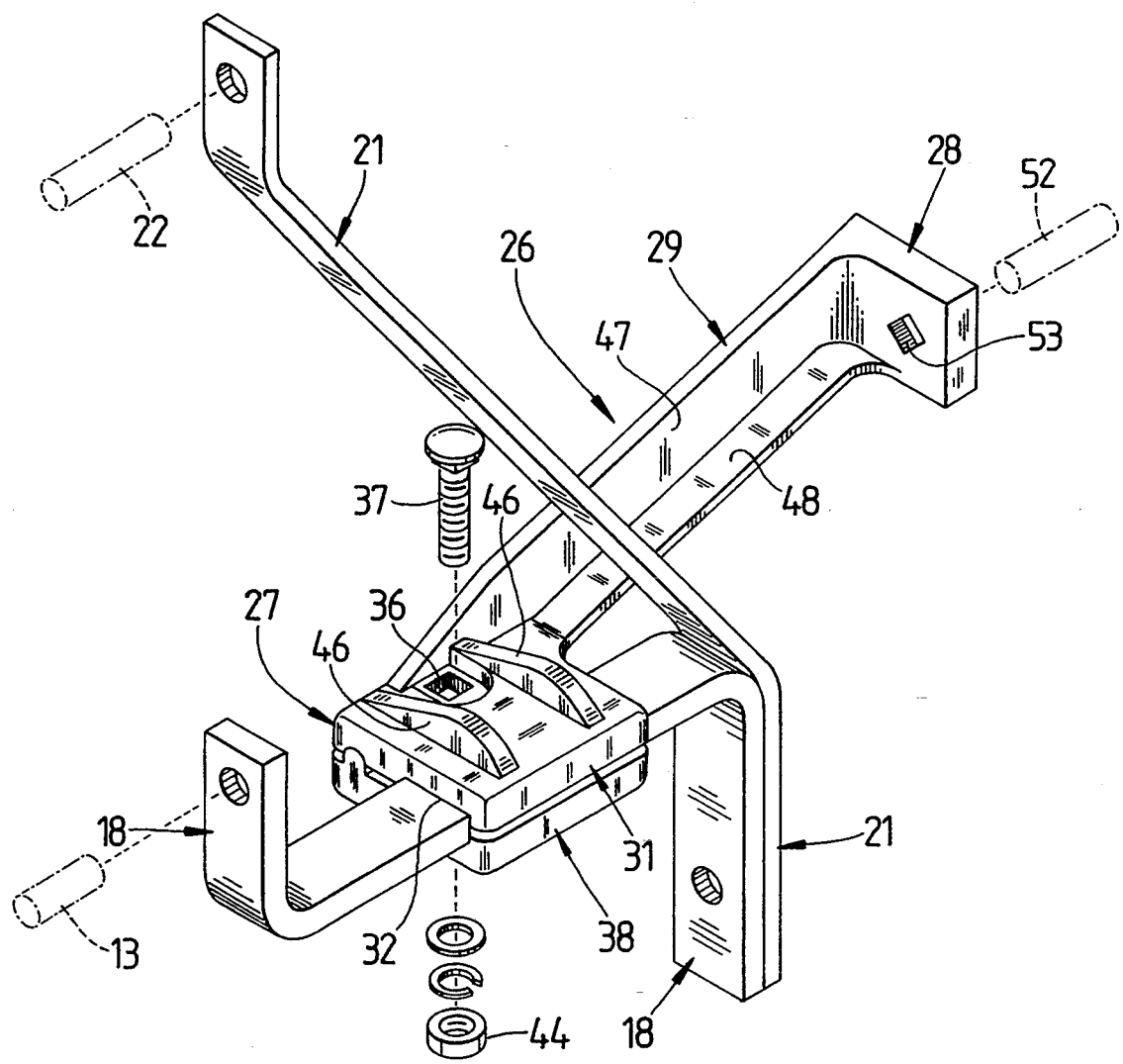
FIG. 3 is a perspective view of the cable supporting hardware including our invention.
Figure 4:
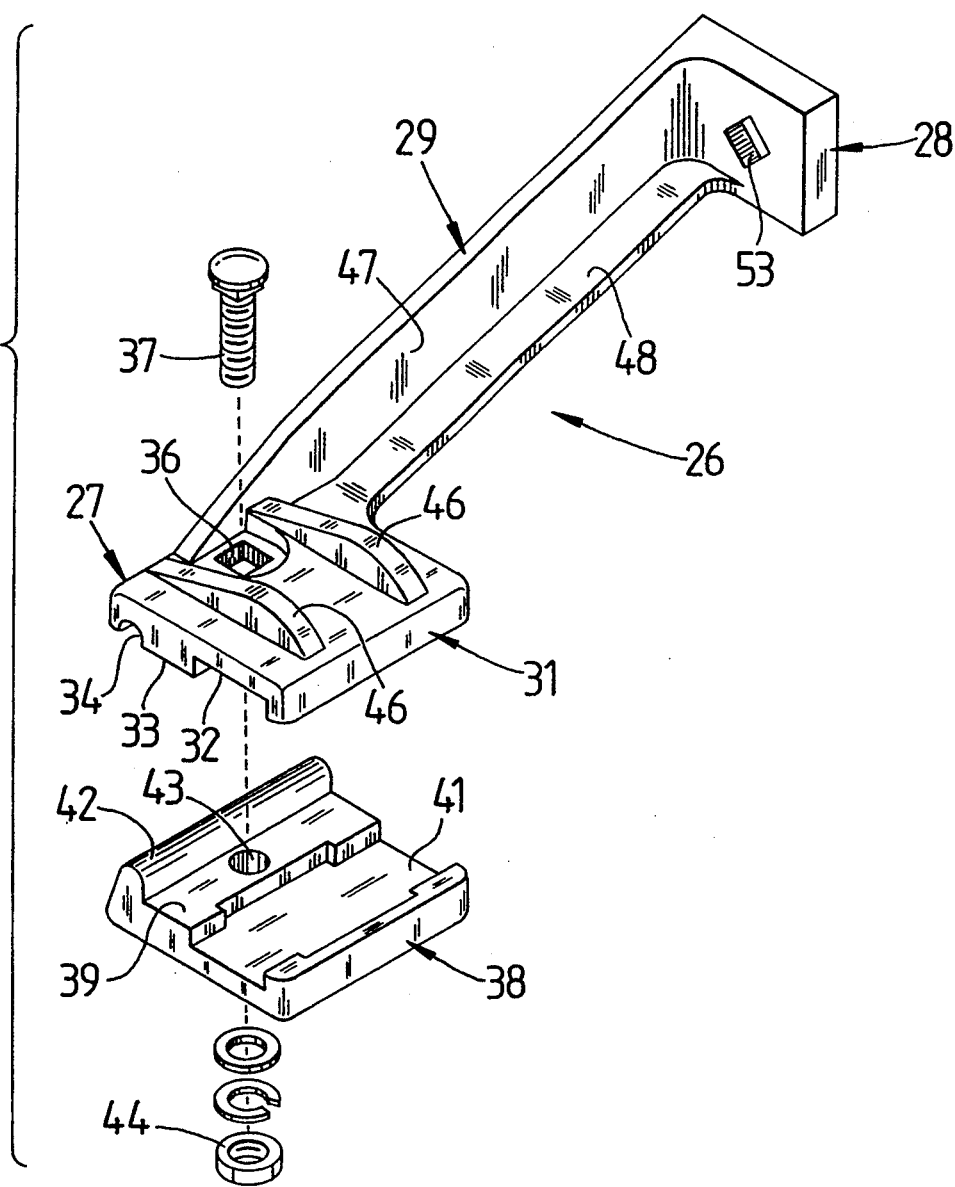
FIG. 4 is an exploded view of the attachment.
Figure 5:
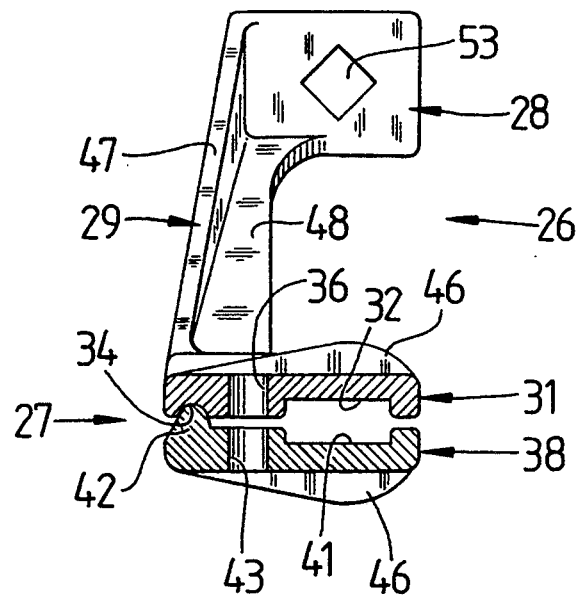
FIG. 5 is a sectional view along line 5—5 of FIG. 1.

As most clearly shown in FIGS. 2 & 3, the shank 29 extends from and is integral with the portion of the base 31 overlying rounded recess 34, thus the shank 29 is laterally disposed relative to the support arm 18 and strap 21 such that all three members extend outwardly from the pole 11 in parallel vertical planes at different angles of inclination such that strap 21 is connected to arm 18 at an outer portion thereof while shank 29 is connected to arm 18 by clamp end 27 and extends outwardly beyond support arm 18. To provide proper rigidly the shank 29 is formed as an angle having essentially perpendicular flanges with one flange 47 aligned in a vertical plane and the other flange 48 extending from the bottom of flange 47 in the same direction as the base 31. It will be noted that both flanges extend from the base 31 at an angle relative to the plane of the base 31 such that with the base 31 placed atop the support arm 18 the shank 29 extends upwardly and outwardly relative to the pole 11.

The shank 29 terminates at the free end 28 which as seen in the figures extends in a plane perpendicular to the plane of the base 31 and thus perpendicular to the support arm 18. The free end 28 extends across the end of the support arm 18 in upwardly and outwardly spaced relation thereto such that a strand clamp 51 affixed thereto by a nut and bolt combination 52 passing through an aperture 53 lies in the same plane as the strand clamps 51 used to support the telecommunications cable 12 and the secondary communications cable 19. In this manner torsional loading of the support arm 18 and strap 21 are minimized. As will be appreciated the third communications cable 54 is supported on the strand clamps 51 by an auxiliary strand 56 held within the clamps 51 and the conventional lashings between strand 56 and the communications cable 54.

From the foregoing it should be apparent that our auxiliary cable attachment 26 provides a simple and efficient means for supporting a third cable. The installer using our device need only check to see whether a bolt 22 has been used at the upper end of strap 21 and install such a bolt 22 if one is not already in place. The attachment 26 is then installed on the support arm 18 by displacing the keeper 38 sufficiently to place the clamp end 17 around the horizontal portion of the support arm 18 and tighten the single bolt 22 to secure the support arm 18 in the opposing channels. When the attachments have been thus secured, the strand 56 and cable 54 may be strung outwardly and upwardly of the existing cables. As will be noted, the only adjustment to the existing hardware or cables is the possible utilization of bolt 22 to replace the screw. This is a minor task compared to setting new poles and installing new hardware. Accordingly, new cable service can be installed on the existing utility infrastructure without any disruption of existing services. Further, by utilizing our attachment the new cable is suspended at a location that is the same radial distance from the superjacent power cable as the original communication cable 12 and is the same distance from the second cable 19 as the second cable is from the communication cable 12. Additionally, easy access to all of the existing cables and mounting structure is maintained.

While we have shown our invention in one embodiment, it will be obvious to those skilled in the art that it is not so limited but is susceptible of various changes and modifications without departing from the spirit thereof.

Having set forth the nature of the present invention, what we claim is:

1. In combination with a cable support pole having a pair of parallel fasteners extending through the pole at different heights, a first strand clamp mounted by a lower fastener of said pair to the pole and a first communication cable strand secured by the first strand clamp, a support bar secured at one end to said lower fastener and extending horizontally from said pole, a second strand clamp affixed to said support bar at a point laterally spaced from said first clamp and adapted to secure a second communication supporting strand in place, and a brace extending diagonally between an upper fastener of said pair and a lower end attached to said support bar distal said pole, the improvement comprising:

(a) an extension member extending above said support bar and outwardly from said pole from a connection point intermediate said pole and said lower end to a point outwardly of said support bar, said extension member connected to said support bar at said connection point without disengaging said support bar or said first and second supporting strand; and (b) a third strand clamp adapted to secure a third communication cable supporting strand in place laterally spaced from and above said second communication cable supporting strand such that said first and third clamps are aligned in a vertical plane at equal-distant radial measure from a superjacent conductor with said second strand being equal-distant from said first and second strand.

2. The invention as defined in claim 1 wherein said extension member further comprises a base portion extending transversely of said supporting bar and defining a downwardly opening channel for receiving a portion of said supporting bar therewithin, a keeper cooperatively positioned beneath said base portion and defining an upwardly opening channel opposing said downwardly opening channel for receiving said portion of said supporting bar therewithin and means for selectively urging said keeper toward said base portion to capture said support bar therebetween in load bearing engagement.

3. The invention as defined in claim 2 wherein said means for selectively urging comprises an elongated threaded member affixed to said base portion and extending downwardly laterally of said support bar through an aperture in said keeper and a rotatable threaded fastener engaged on said threaded member subjacent said keeper.

4. The invention as defined in claim 1 wherein said extension member comprises a base portion defining a first c-shaped channel for engaging a portion of said support bar therein a detachable keeper defining an opposing c-shaped channel therein for engaging said portion of said support bar therein and means for selectively urging said keeper into cooperative engagement with said base portion and said supporting bar such that said extended member is rigidly secured in load bearing engagement with said support bar.

5. The invention as defined in claim 1 wherein said extension member comprises a clamp portion including a movable keeper and a fixed portion, an elongated shank portion extending from said fixed portion past and laterally of said base, and an offset portion adapted for attaching said third strand clamp thereto.

6. The invention as defined in claim 5 wherein said movable keeper and base portion each define opposing channels within which said supporting bar is engaged and means for urging said keeper into rigid engagement with said supporting bar.

7. The invention as defined in claim 6 wherein said keeper includes a means for alignment with said base portion and said means for urging comprises a threaded connector engaging said base portion and said keeper laterally of said supporting bar.

8. The invention as defined in claim 5 wherein said elongated shank portion extends upwardly and outwardly from the plane of said base portion and comprises perpendicular integral flanges extending between said base portion and said offset portion.

9. Apparatus for supporting a communication cable in an auxiliary position relative to a preexisting cable supported on a laterally extending support bar mounted at a selected height on a utility pole comprising an extension member including a clamp end, an offset elongated shank extending upwardly and outwardly of said clamp end relative to said utility pole, and a free end distal said clamp end and clamp means detachably affixed to said free end for supporting said communication cable wherein said clamp end includes means for capturing said support bar within opposed channels formed in said clamp end by external engagement only.

10. Apparatus for supporting a communication cable in an auxiliary position relative to a preexisting cable supported on a laterally extending support bar mounted at a selected height on a utility pole comprising an extension member including a clamp end, an offset elongated shank extending upwardly and outwardly of said clamp end relative to said utility pole, and a free end distal said clamp end and clamp means detachably affixed to said free end for supporting said communication cable wherein said clamp end comprises a base portion extending transversely of said supporting bar and defining a downwardly opening channel for receiving a portion of said supporting bar therewithin, a keeper cooperatively positioned beneath said base portion and defining an upwardly opening channel opposing said downwardly opening channel for receiving said portion of said supporting bar therewithin and means for selectively urging said keeper toward said base portion to capture said support bar therebetween in load bearing engagement.

11. The apparatus as defined in claim 10 wherein said means for selectively urging comprises an elongated threaded member affixed to said base portion and extending downwardly laterally of said support bar through an aperture in said keeper and a rotatable threaded fastener engaged on said threaded member subjacent said keeper.

12. The apparatus as defined in claim 11 wherein said elongated shank portion extends upwardly and outwardly from the plane of said base portion and comprises perpendicular integral flanges extending between said base portion and said offset portion.

13. Apparatus for supporting a communication cable in an auxiliary position relative to a preexisting cable supported on a laterally extending support bar mounted at a selected height on a utility pole, said bar having an end distal said pole, comprising an extension member including a clamp end attached to said bar at a connection point intermediate said pole and said distal end, an offset elongated shank extending upwardly and outwardly of said clamp end relative to said utility pole, and a free end distal said clamp end and clamp means detachably affixed to said free end for supporting said communication cable wherein said clamp end includes means for capturing said support bar within opposed channels formed in said clamp end by external engagement only.

* * * * *